United States Patent [19]

Stratton et al.

[11] Patent Number: 4,507,965

[45] Date of Patent: Apr. 2, 1985

[54] DETECTOR FOR DETERMINING BOTH FORCES ON AND POSITIONS OF A HOST DEVICE

[75] Inventors: Leo M. Stratton, West Chester; Kenneth J. Sipple, Chester Heights, both of Pa.; Mario B. Tatonetti, Voorhees, N.J.

[73] Assignee: Columbia Research Laboratories, Woodlyn, Pa.

[21] Appl. No.: 422,749

[22] Filed: Sep. 24, 1982

[51] Int. Cl.³ ............................ G01P 15/13; G01C 9/12
[52] U.S. Cl. ................................... 73/517 B; 33/366
[58] Field of Search .................... 73/514, 515, 516 R, 73/517 R, 517 B, 503, 496; 33/366; 308/174, 176

[56] References Cited

U.S. PATENT DOCUMENTS

| | | | |
|---|---|---|---|
| 2,923,500 | 2/1960 | Dixson et al. | 73/517 R |
| 3,176,521 | 4/1965 | Clark | 73/517 B |
| 3,610,714 | 10/1971 | Gaeta | 308/174 |
| 3,677,947 | 7/1972 | Ray et al. | 335/302 X |
| 3,789,674 | 2/1974 | Anderson et al. | 73/517 R |
| 4,080,835 | 3/1978 | Marquess | 73/517 B |

Primary Examiner—James J. Gill
Attorney, Agent, or Firm—William E. Cleaver

[57] ABSTRACT

The present invention employs a mass which is movable toward or away from a detection device. The detection device generates electrical signals which because of their polarities and amplitudes act, when transmitted to an electrical coil, to provide torque and move the mass to an equilibrium position. The electrical signals also serve as a measure of forces on, or an indication of a position of, the device with which the present detector is used. The mass and the coil are mounted on shaft means which in turn is mounted in a pair of ball bearing assemblies. The ball bearing assemblies fit around the periphery of the shaft to provide substantial lateral restraint and further fit at the ends of the shaft to provide substantial vertical restraint. In addition the present invention provides a pair of heavy flux density producing magnets, which are separated by a gap within which the coil moves. Further in addition, the present arrangement includes an infrared light source and an infrared light sensitive device which act together to transmit IR light to and receive IR light from the mass means to generate signals indicative of the mass means position.

4 Claims, 8 Drawing Figures

DETECTOR FOR DETERMINING BOTH FORCES ON AND POSITIONS OF A HOST DEVICE

BACKGROUND

Accelerometers have come to be used not only as a means for detecting changes of velocity of a device to which they are attached but as a means for detecting the position or attitude of a device to which they are attached (the host device). In the prior art accelerometers, a large coil for torque, or motor effect, has been employed. On one side of the frame holding said large coil there has been mounted a mass member. The mass member and the large coil have been designed to have a rotational movement into a magnetic flux field. The mass member responds to forces exerted on the host device (such as a change of inertia), or to a position or change of position of the host device (in response to gravity force). Such an accelerometer has a means to detect a change of position of the mass member and generate an "error" indicating such a change. The "error" signal so generated is transmitted to the large coil and a motor effect, or torque, is generated whereby the coil, and thus the mass, is moved to a point where torque matches the force applied. The accelerometer circuitry measures the error signal as an indication of the force on, or of a position of, the host device.

In the prior art accelerometer the mass has been attached to a frame which held the large coil. The frame has had two pivots mounted thereon and the pivots have been mounted onto two jewels. The jewel mounting means has a cup configuration. One of the major problems with the foregoing prior art design is that the mass hanging from the coil frame tends to distort the frame because of the lever effect of the weight (force) and the arm between the mass and the frame. With or without the distortion the weight, or mass, applies a force to the pivots which tends to move them to one side of the cupped jewel housing. This unbalance causes the pivots to wear per se and wear the jewel mounting as well. Accordingly the mountings holding the coil develop a loose fit, or "slop," and the frame starts to spuriously move laterally, without forces being applied, or in combination with forces being applied. The spurious lateral movement enables the mass member to move into incorrect and inconsistent positions relative to the electrical detection and spurious "error" signals are very often generated.

To overcome the foregoing problem the jewel mountings have been spring loaded to force the jewel mountings against the pivots. This solution of course added to the friction force between the jewel and the pivot and eventually caused more wear. The lifetime (before repair) of such prior art devices has been in terms of hours.

In addition, in the prior art, the circuitry employed a high frequency oscillator and an AM detector along with some elaborate interconnecting circuits. This prior art circuitry generated a substantial amount of RF noise. Accordingly, if such an accelerometer were used in aircraft or on shipboard or the like, the RF noise has been found to be undesirable.

The present device eliminates the problem of excessive wear at the pivot points and hence, eliminates the resulting spurious signals described above. In addition the present invention reduces the distortion of the coil frame and virtually eliminates the RF noise problems. Further in addition, the present invention improves the sensitivity and reduces the required hardware.

SUMMARY

The present device has four principal features. First the shaft means is mounted in a pair of ball bearing assemblies. Each of the ball bearing assemblies has a case in which ball bearings are mounted and which is designed to fit 360° around the shaft. Such an arrangement provides lateral restraint to the shaft and not at a point of pivot, as in the prior art. In addition as part of the ball bearing assembly, in a preferred embodiment, there is a ball bearing mounted at each end of the shaft to provide vertical restraint. According to another feature, in a preferred embodiment, the "motor" coil or torque coil is mounted as a counter balance to the mass member on the shaft so that any "lever" effect, which the mass may have, is applied to the shaft and not to the coil per se, as in the prior art. Further in addition, in a preferred embodiment, the circuitry is reduced componentwise so that the RF noise problem is drastically reduced and in most cases eliminated. Finally the present system provides an improved magnetic flux arrangement which improves the sensitivity of the system for relatively small displacements.

The objects and features of the present invention will be better understood in view of the following description taken in conjunction with the drawings in which.

Figure 1:
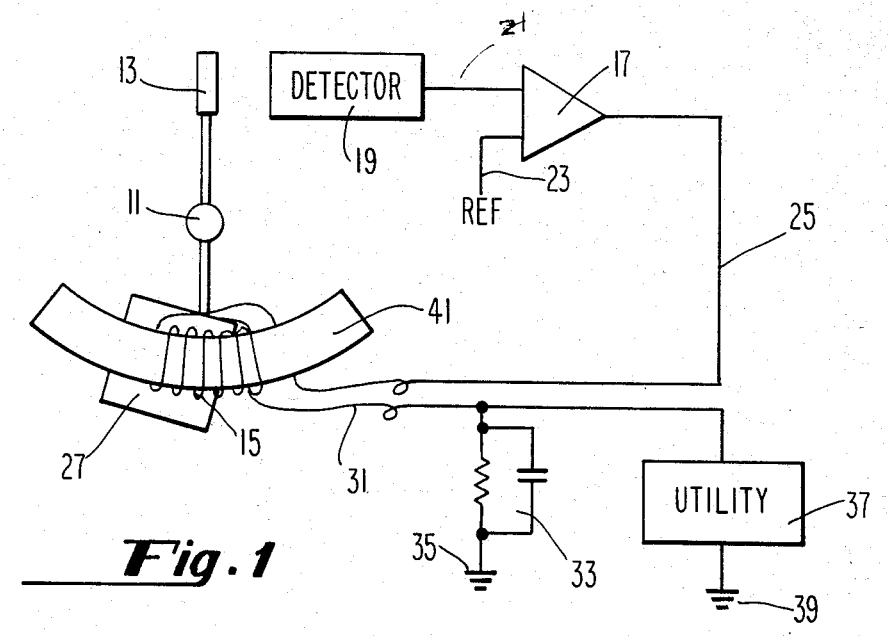
FIG. 1 depicts a block diagram, partial pictorial, circuit used with the present device.

Consider FIG. 1. In FIG. 1 there is shown a shaft 11. On the shaft 11 there is mounted a mass member 13 and a motor coil 15. The coil 15 is referred to as a motor coil because when electrical current is passed through the coil 15, the magnetic flux generated thereby will add on one side of the coil and subtract on another side of the coil to provide torque, a motor effect, to move the coil and hence the mass member. The current provided to the motor coil to cause the torque phenomenon described above, is generated as an "error" signal from the amplifier 17. When the mass 13 moves toward (or away from) the detector 19 it causes an electrical signal of more or less amplitude (more or less than the signal from an arbitrary home, or equilibrium, position) to be transmitted on line 21 to the amplifier 17. At amplifier 17 the signal on line 21 is compared against the reference signal on line 23. Accordingly an error, or difference, signal is transmitted on line 25 to the coil 15. The amplifier 17 in the preferred embodiment is a CA741 manufactured by RCA Corporation and others. It should be understood that other forms of amplifiers could be used. The detector 19 is an OPB706A manufactured by Optron Co., in the preferred embodiment and it should be understood that other types of detectors could be used.

As described above when the error signal is transmitted to the coil 15, the magnetic flux generated thereby combines with flux from the magnet 27 (and another magnetic not shown in FIG. 1 but identified as magnet 29 in FIG. 2), to cause a torque which moves the mass member 13 toward the detector 19 or away from the detector 19 depending on whether the error signal is "plus" or "minus" current. The "error" signal is transmitted along line 31, through the integrating circuit 33 to ground 35. The "error" signal is also passed to the utility circuit and to ground 39. At the utility circuit the "error" signal is detected as a measure of the forces applied to the host device, or of the position of the host device. The integrator circuit 33 acts to dampen any efforts of the coil and the mass to "hunt" for an equilibrium position. As soon as the mass 13 starts to move in response to a force (gravity in the case of position detecting) the error signal on line 25 causes the flux force on coil 15 to oppose the movement of the mass 13. Accordingly when the force on mass 13 equals the torque caused by the current in the coil 15, the mass will be in an equilibrium position and the error signal on line 31 will be a measure of the force. When the force on the mass is reduced, the torque will tend to move the mass but almost simultaneously therewith the error signal will be reduced to, in turn, reduce the opposing torque.

Figure 2:
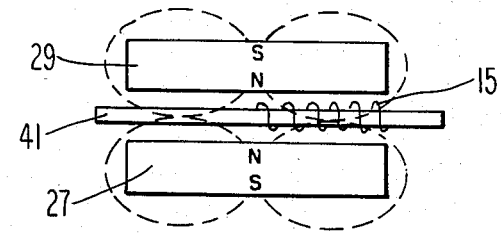
FIG. 2 depicts a schematic layout of the magnets and motor coil of the present device.
Figure 3:
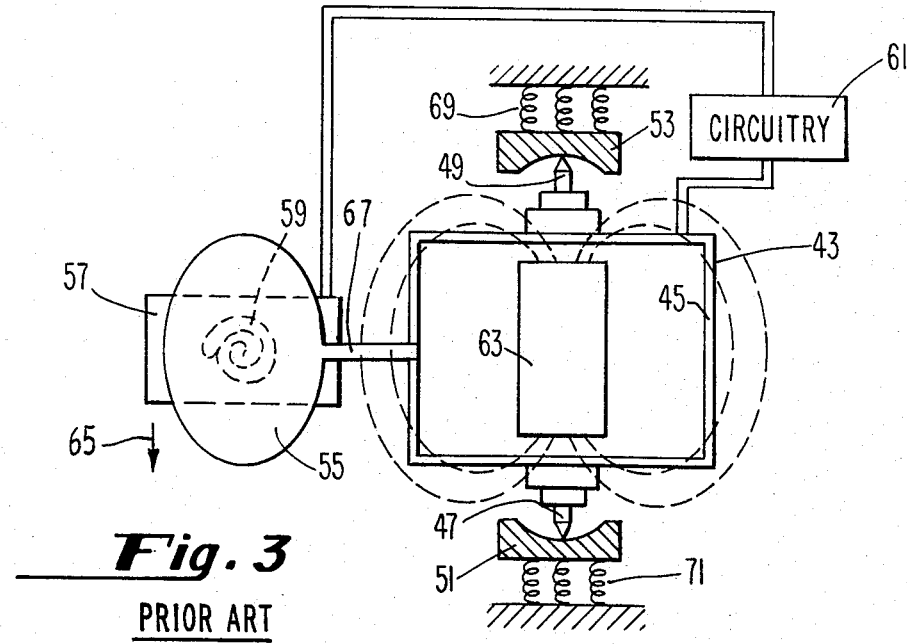
FIG. 3 shows a pictorial arrangement of the prior art.

FIG. 2 shows the arrangement of the magnets as used with the present system. As can be seen in FIG. 2 there is a pair of magnets 27 and 29. Disposed between the magnets 27 and 29 there is located a keeper member 41 which provides a flux path for the flux from magnets 27 and 29. As can be seen in FIG. 2 the flux from magnet 29 is from the north pole through the keeper 41 to the south pole. The flux from magnet 27 has a mirror image path. The coil 15 is mounted on the keeper 41 and can be moved therealong. As the coil 15 moves along the keeper 41 it is entwined by the heavy flux density between the magnets 27 and 29 which causes a dramatic torque effect for a relatively small displacement. The magnet arrangement, shown in FIG. 2, is different from the prior art, (as will be better understood when FIG. 3 is described hereinafter) in that the magnetic flux is confined to a relatively small space and therefore as the coil is energized by the error signal there is a good response torquewise. This arrangement provides better sensitivity than in the prior art and enables a smaller package to be fabricated because the magnets, when arranged as shown, can be relatively small.

FIG. 3 depicts the prior art arrangement. In FIG. 3 there is shown the motor coil 43 mounted on a large frame 45. Onto the frame 45 there are mounted two shaft pivots 47 and 49. The shaft pivots 47 and 49 are mounted respectively in the jewels 51 and 53. The interior of the jewels 51 and 53 are shown to be cup shaped or concave, and are shown in exaggerated form for the purposes of discussion. The mass 55 is shown mounted on the frame 45. As the mass 55 is moved toward the detector 57, the flux from electrical current flowing in the coil 59, causes eddy current in the mass which in turn (through a transformer effect) causes the amplitude of the signal through the coil 59 to be reduced. The signal from the detector 57 is analogous to the signal on line 21, described above, and when passed to the circuitry 61 provides an error signal to coil 43. The flux from coil 43 combines with the flux from the magnet 63 to provide torque to move the mass 55, as described above in connection with FIG. 1.

It should be noted in FIG. 3 that the mass 55 is pulled downward, as depicted by arrow 65 and through the arm 67 and frame 45 there is an amplified force applied to the pivots 47 and 49. The amplified force tends to make the pivots 47 and 49 rotate counter clockwise. The continued presence of such an amplified force causes the pivots to wear on the cupped jewels 51 and 53. The wear on the jewels and on the pivots per se, because of the amplified force just described, causes a loose fit to soon develop. Accordingly after very short use (hours) it has been found that spurious lateral movement occurs. Such spurious lateral movement causes the mass to erroneously move closer to coil 59 than it should move or farther away from coil 59 than it should move. In addition the amplified force, described above, causes frame 45 to distort, i.e. become out of shape, which in turn causes the coil 43 to change its shape. Such distortion has been found to create an unbalanced movement of the coil 43 and frame 45 and hence an erroneous positioning of the mass member or vane. As can be gleaned from FIG. 3, it has been the practice in the prior art to spring load the jewel mounting, as shown by springs 69 and 71. Such spring loading provides vertical restraint and compensates for some wear movement. However such spring loading increases the friction factor, thereby reducing the sensitivity of the device. In addition the spring loading adds to the wear of the pivots and the jewels.

Also as can be seen in FIG. 3, the flux from magnet 63 is not confined to relatively small position and therefore the flux density through which the coil 43 passes when the mass member responds to a force is not a heavy flux density by comparison to the present device. One of the advances of the present system over the prior art is to provide the two magnets 27 and 29 along with the keeper 41 in such an arrangement that the flux density therebetween is relatively high. In the preferred embodiment the magnets 27 and 29 are made of the rare earth, cobalt, which provides a greater flux density than alnico and in addition the rare earth, cobalt, does not degradate as rapidly as prior art magnetic material.

Further the prior art includes a high frequency oscillator which forms a source of RF noise. Accelerometers are very often used aboard aircraft or other devices which are vulnerable to RF noise and the noise generation of the prior art accelerometers is an undesirable characteristic. In order to overcome this infirmity in the prior art additional circuitry is employed to filter the RF noise.

Figure 4:
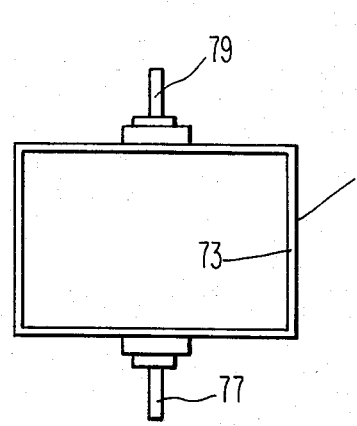
FIG. 4 shows the large motor coil with the improved shaft.
Figure 5:
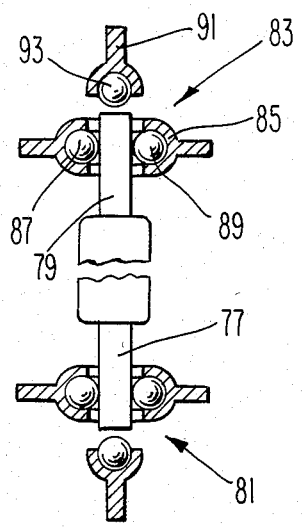
FIG. 5 shows, in pictorial view, the ball bearing mountings on the shaft.

FIG. 4 shows a modification of the motor coil and frame of FIG. 3. In FIG. 4 there is shown a frame 73 surrounded by a coil 75. However instead of having pivots 47 and 49 of FIG. 3, in the structure of FIG. 4 there are included two shafts 77 and 79. The shafts 77 and 79 are each respectively fitted into associated ball bearing assemblies, such as assemblies 81 and 83 of FIG. 5. Ball bearing assembly 83 includes a race member 85, or ball bearing holder. The race member 85 holds ball bearings, such as ball bearings 87 and 89, to surround the shaft 79. The race member 85 is shown in cross section in FIG. 5 and it should be understood that the ball bearings are located 360° around the shaft 79. The single ball bearing holder 91 is disposed or located so that there is a slight gap between the top of the shaft 79 and the ball bearing 93. The slight gap accommodates any thermal expansion of the shaft 79 or the frame 73 to which the shafts are secured. At the same time the ball bearing 93 provides for vertical restraint of the motor coil assembly. The circumferential ball bearings, such as ball bearings 87 and 89, provide lateral restraint so that spurious lateral movement (as described in connection with the prior art structure of FIG. 3) does not occur. Despite the lateral restraint and vertical restraint by the ball bearing assembly 83 the shaft 79 has freedom for rotational movement and such rotational movement is without any meaningful frictional restraint. The bottom part of FIG. 5 shows the shaft 77 in a ball bearing assembly 81. The ball bearing assembly 81 is identical to the ball bearing assembly 83 and has the same function so that no further explanation is needed.

Figure 6:
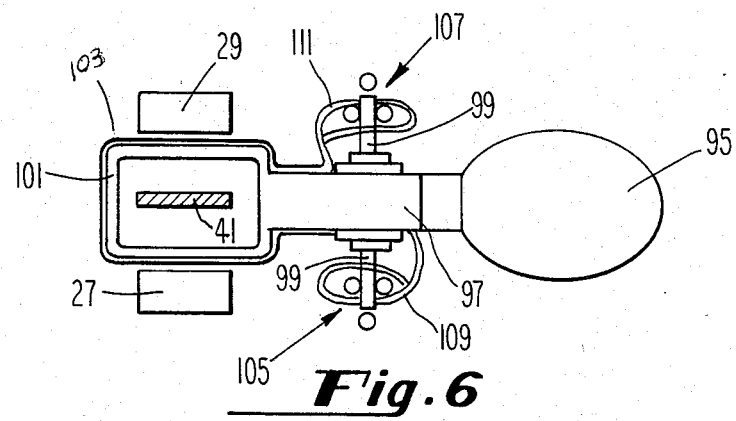
FIG. 6 is a side view, in pictorial, of the motor coil in counter balance with the mass, mounted on a common shaft.

FIG. 6 shows a preferred embodiment of the present invention. In FIG. 6 there is shown a vane 95, or mass 95, which is mounted through a center arm 97 to a shaft 99. The shaft 99 passes through the center arm 97 and is secured thereto. It should be understood that the shaft could be made integral with the center arm or two shafts (such as shafts 77 and 79 of FIGS. 4 and 5) could be secured to the center arm 97. At the other end of the center arm 97 there is secured a coil frame 101 and a coil 103. The coil frame 101 and coil 103 have some counterweight effect on the shaft 99 to partially counterbalance the lever effect of the mass 95. The lever effect of the mass 95, while it does cause some forces on the shaft 99, does not cause any distortion effect on the coil 103 as was true in the prior art and explained in connection with the description of FIG. 3.

As can be seen in FIG. 6 the shaft 99 is mounted in the ball bearing assemblies 105 and 107 which are symbolically represented by the three ball bearings on the top and bottom of the shaft. It should be understood that ball bearing assemblies such as those shown in FIG. 5 (i.e. assemblies 81 and 83) are employed with the structure of FIG. 6. In FIG. 6 the magnets 27 and 29 as well as the keeper 41 are shown and no further explanation of their role is deemed necessary.

In FIG. 6 there are shown two springs 109 and 111. The springs 109 and 111 act as a conductive path to provide electrical current to coil 103. It should be understood that other forms of electrical circuitry could be used for this purpose.

Figure 7:
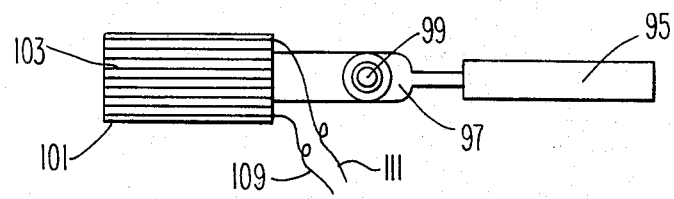
FIG. 7 is a top view of the device shown in FIG. 6.

FIG. 7 shows some of the structure of FIG. 6, from a top view. The identification numbers of FIGS. 6 and 7 are identical and no further explanation is deemed necessary.

Figure 8:
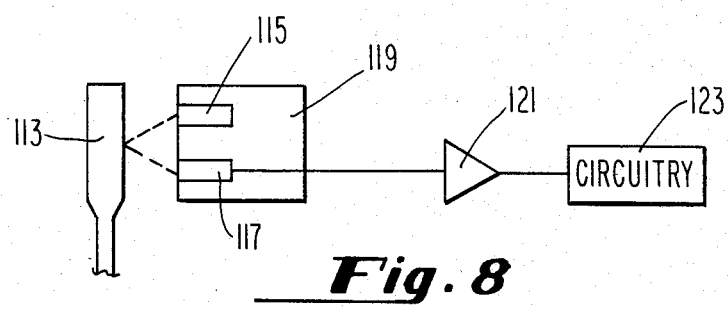
FIG. 8 is a schematic of an IR detector.

FIG. 8 depicts an improved position detector for use with the vane or mass. In FIG. 8 there is shown a mass 113. Lying in close proximity to the mass is an infrared source 115 and an infrared energy sensitive transistor 117. The infrared energy source 115 is located such that when the mass 113 is relatively close to the housing 119 a great deal of IR energy will be reflected from the mass 113 and received by the IR sensitive transistor 117. Accordingly a signal is transmitted from the transistor 117 to the amplifier 121 and on to the utility circuitry 123. The amplifier and utility circuitry of FIG. 8 are similar to the circuitry shown in FIG. 1. As the mass 113 moves farther away from the housing 119, a lesser amount of IR energy is received by the transistor 117 and a commensurate signal is transmitted to amplifier 121 and to the utility circuitry 123. The use of the IR source and receiver eliminates the need for an oscillator and an AM detector. Such an arrangement reduces any RF noise, and permits smaller packaging of the circuitry, which is a highly desirable feature.

The present invention employs at least four features, each of which is an advance over the prior art. The mounting of the shaft in a ball bearing assembly permits easy rotational movement but eliminates the spurious lateral movement of prior art devices. The location of the two small magnets with respect to the motor coil improves the flux density with respect to the coil and reduces the size of the package. The mounting of the motor coil as a counterbalance to the mass reduces the lateral loading on the shaft and eliminates the tendency to distort the coil and coil frame. Finally the use of the IR source and receiver eliminates the RF noise and reduces the size of the package.

We claim:

1. A detector means for use in determining information about forces applied to, and alternatively positions of, a device with which said detector means is used comprising in combination: mass member means having length, width and depth dimensions; first and second magnetic flux generating means disposed to have a gap therebetween; magnetic flux conducting means disposed within said gap; electrical coil means formed to be movable within said gap and formed to surround said magnetic flux conducting means when moved within said gap; shaft means having first and second protrusions and formed to hold said electrical coil so that its longitudinal axis is substantially perpendicular to said first and second protrusions and formed to hold said mass member means so that its depth dimension is substantially perpendicular to said protrusions, said shaft means further formed to hold said electrical coil means and said mass member means at opposite ends of said shaft means and for rotational movement around said protrusions; first and second ball bearing assemblies formed to fit respectively over said first and second protrusions and formed so that while each of said protrusions is held in substantial lateral and vertical restraint, each of said protrusions is free for rotational movement within minimal frictional restraint, said first and second ball bearing assemblies disposed to hold said shaft means at said protrusions so that said electrical coil means will be rotationally moved through at least a part of said magnetic flux in response to any positioning of said mass member means; and detection means formed and disposed to respond to every position of said mass member means to provide electrical current to said electrical coil to effect positioning said mass member means and to detect said electrical current as a measure of force applied to, and alternatively positions of, a device with which said detector means is used.

2. A detector means according to claim 1 wherein said mass member means and said electrical coil are formed such that they substantially counter balance one another to reduce the wear on said protrusions.

3. A detector means according to claim 1 wherein each of said ball bearing assemblies includes at least one ball bearing holder which is formed and disposed to hold ball bearing means in close proximity to an end of one of said protrusion means and along a segment surrounding said protrusion means.

4. A detector means according to claim 1 wherein said detector means includes an infrared light source disposed to transmit light to said mass member for reflection therefrom and includes an infrared light sensitive means formed and disposed to receive light reflected from said mass member means to generate an electrical signal indicative of the distance of said mass member means from said detection means.

* * * * *